United States Patent Office 3,401,426
Patented Sept. 17, 1968

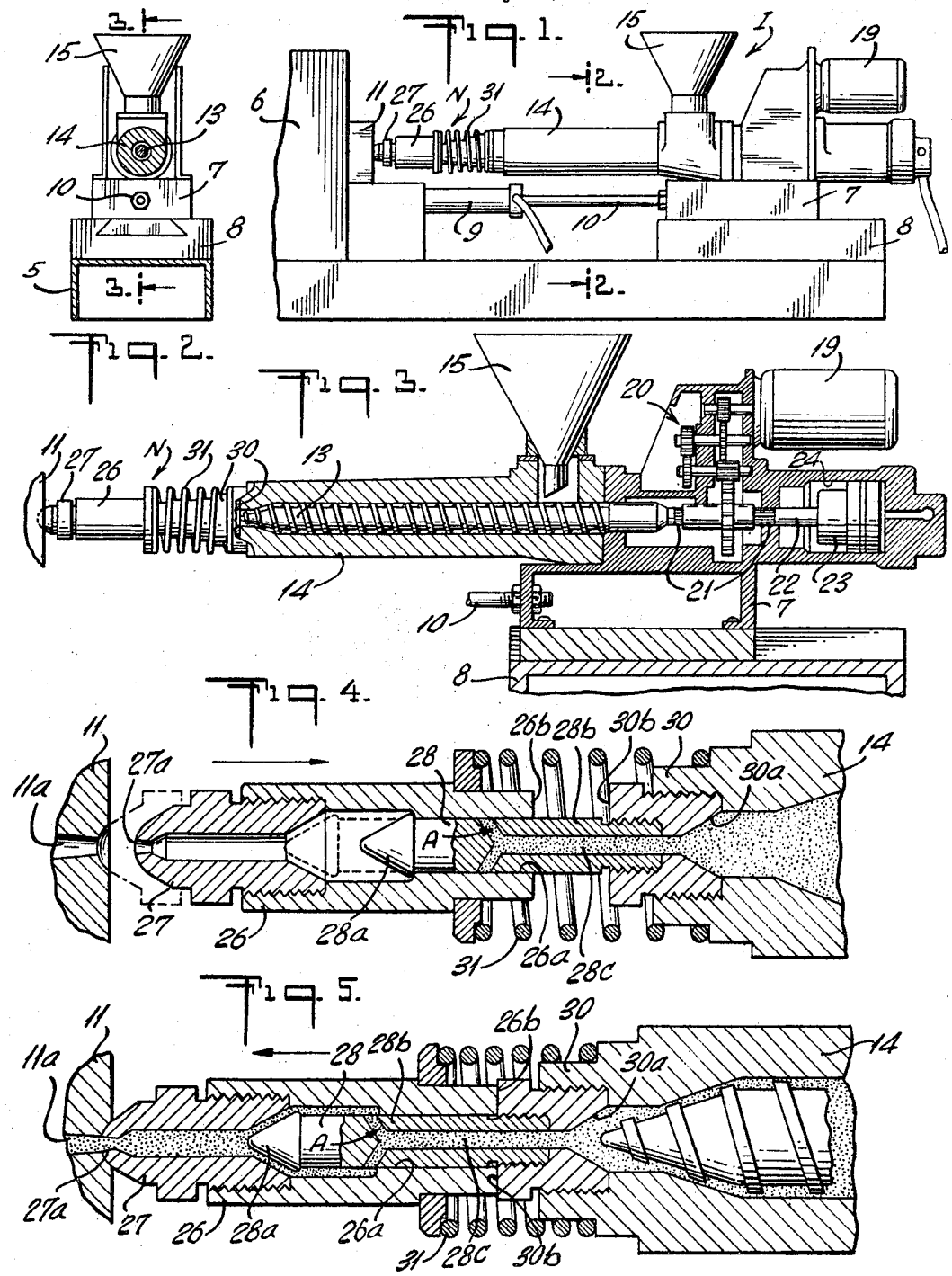

3,401,426
PLASTIC INJECTION MOLDING MACHINE
William B. Evans, New Britain, Conn., assignor to The New Britain Machine Company, a corporation of Connecticut
Filed May 31, 1966, Ser. No. 553,854
10 Claims. (Cl. 18—30)

ABSTRACT OF THE DISCLOSURE

The invention provides a novel injection-nozzle system for plastics injection-molding machines, involving the operation of supply means for moldable fluent plastic material. The novel internal structure of the nozzle and its supply means is such as to overcome the problem of premature drool of plastic, occasioned by removal of pressure on the liquid plastic, between injection-shot cycles.

---

This invention relates to injection molding machines and more particularly to their injection systems by which moldable plastic is injected into molds in mold systems.

An object of the invention is to provide a novel injection system, to provide a novel injecting arrangement and mode of operation of supply means for mldable fluent plastic and a nozzle to transmit plastic from the supply means to the mold.

An object is to provide in such arrangement a supply chamber for the fluent plastic in combination with a nozzle to apply injective force to receive plastic for charging a mold.

An object is to provide the injection nozzle with coacting nozzle chamber and plunger elements of which the nozzle chamber has an outlet directly into intake channeling of the mold and the plunger reaches from the supply chamber into the nozzle chamber.

An object is to provide such injection nozzle for operation through a forward or injection stroke and a return stroke, to provide this nozzle in association with a supply cylinder having a ram operable through a ramming advance for increasing the pressure of flow of fluent plastic from the supply cylinder to the nozzle chamber, to provide the cylinder with a ram having ejected force in tandem with and concurrent with the injective force of the nozzle so that the mold will be charged by the nozzle aided by the ram, to provide for cutting off communication between the nozzle chamber and the supply cylinder at the end of the return stroke of the nozzle, and to provide such nozzle in combination with a supply cylinder and ram which are elements of plasticizing mechanism to convert make-up material into plastic melt.

A problem in injection molding is premature drool of plastic melt into openings of the mold and resulting interference with the quality of the next charge of melt into the shaping interior (or cavity) of the mold. This problem is particularly acute for a mold system in which the plastic in the intake channeling remains fluent while the plastic in the shaping interior sets.

An object of the invention is to provide means to overcome the problem of premature drool. According to the invention, a nozzle between a supply cylinder for plastic melt and a mold system has a chamber and a companion plunger relatively reciprocable through forward and return strokes; the chamber is at the mold system and the plunger at the outlet of the supply cylinder. Communication between the supply cylinder and the nozzle chamber is through a valve passage which is closed when the plunger is in rear position in the nozzle chamber at the end of a decompression stroke. The nozzle chamber has a capacity which is not necessarily related to that of the intake channeling of the mold and has a constricted outlet to register with the inlet of the intake channeling. In the forward or compression stroke, the nozzle plunger moves forward and contracts the space in the chamber while a normally closed valve passage is opened, to permit plastic melt under pressure to flow from the supply cylinder to the nozzle chamber and then to force a charge into the mold. At the end of the compression stroke, there is a residual mass of melt filling the contracted chamber space. After the plastic melt in the mold cavity has set, the return or decompression stroke of the nozzle is initiated, the plunger retreats, closing off the nozzle valve element and vacating space in the chamber; residual plastic melt flows back into the expanding space and as a result a negative pressure or suction is produced at the outlet of the chamber, causing part of the fluent melt remaining in the nozzle-outlet port (or in the mold port and intake channeling) to flow back into the nozzle chamber. At the end of the decompression stroke, the residaul quantity of melt in the chamber is relieved of pressure and, being viscous, will not drool out of the chamber.

Other objects and various further features of the invention will be pointed out or will occur to those skilled in the art from a reading of the following specification in conjunction with the accompanying drawings which show, for illustrative purposes only, a preferred form of the invention:

FIG. 1 is a fragmentary elevation view of a plastic injection molding machine incorporating the invention:

FIG. 2 is a section on line 2—2 of FIG. 1;

FIG. 3 is an enlarged, essentionally sectional view along a line indicated by 3—3 in FIG. 2; and FIGS. 4 and 5 are further enlarged like central longitudinal sectional views through the nozzle involved in the invention, for two different conditions in the operating cycle.

The machine includes a base 5 mounting a mold system 6 opposite an injection system I. The injection system is slidably mounted, as by dovetail support of its carriage 7 on a fixed guide block 8, for movement toward and away from the mold system. The means to effect such movement may include, for example, fluid-operated means comprising a fixed cylinder 9 and a piston having its rod 10 tied to the carriage 7.

The mold system includes a fixed head member 11 having a sprue 11a which leads directly or through runner means to the shaping interior (or cavity) of a mold. In axial line with the sprue is a tandem arrangement of an elongated supply cylinder 14 for fluent plastic and a nozzle N into which the plastic will flow from the cylinder and from which the plastic will be discharged into the sprue. Cylinder 14 rigidly projects from carriage 7 and contains a ram 13 to aid outflow of plastic from the cylinder to the nozzle.

The cylinder 14 and ram 13 are coacting elements of plasticizing mechanism to convert make-up material such as a granular thermoplastic received from a hopper 15 into a fluent plastic or plasticized melt. Ram 13 is a screw supported for rotation and reciprocation in the cylinder. Rotation of the screw works the make-up material confined in the cylinder bore into a plastic melt and progresses the melt to the front region of the cylinder. Advance of the screw from its shown rear position to its forward position pressures an accumulated mass of melt in front of the screw into the nozzle N. The screw is rotated by a motor 19 through reduction gearing 20 having a splined connection 21 to the screw shank 22. Advance of the screw results from the application of driving fluid pressure to a piston 23 in a chamber 24 of the carriage 7.

At the end of an injection operation, the screw 13 stays in advanced position to allow for setting of the plastic injected into the shaping interior or cavity of the mold. In a manner explained later, after the plastic in the mold cavity has been given time to set, communication between the cylinder 14 and the nozzle is cut off, and the plasticizing mechanism commences to replenish the previously discharged melt with fresh melt. This is done by initiating rotation of screw 13, it being noted that new make-up material feeds from the hopper 15 onto a threaded location of the screw 13, even while in advanced position.

The screw 13 works the new material into fresh melt feeding it to the front of the cylinder and against the cut-off nozzle N, and the accumulating mass of fresh melt exerts back pressure on the screw, returning it rearwardly, against the opposing pressure from cylinder 9. The rotation of the screw may be set for a given period of time, or otherwise, appropriate to the desired charge accumulation. When screw rotation stops, the screw remains in a rear position until the mold is ready to receive a new charge, at which time the piston 23 is again driven forward.

Nozzle N comprises chamber elements 26–27 and a companion plunger 28 relatively reciprocable through compression and decompression strokes. The chamber body 26 is cylindrical and capped by a domed or rounded head 27 adapted to the similarly rounded mouth of the sprue 11a. Head 27 is centrally formed with a constricted port 27a which constitutes an anterior extension of the sprue as long as the domed head stays in its operative position in the mouth of the sprue. As will be made evident below, the plunger 28 is a rigid forward extension of the supply cylinder 14, and the nozzle chamber is slidably carried by the forwardly projecting shank or stem of the plunger.

Plunger 28 comprises an enlarged head 28a at the forward end of a stem 28b, which passes through and is slidably guided by a reduced longitudinal bore 26a at the rear of the nozzle chamber 26. At its rear end, the plunger stem is threaded into the bore of a bushing 30, which is itself threaded into the front end of the supply cylinder 14. The seating of head 28a at the forward end of bore 26a thus defines one limit of the relative movement of plunger 28 and chamber 26, and a compression spring 31 urges the parts to the position shown in FIG. 4.

Bushing 30 is formed with a conical throat 30a which converges from the bore of the cylinder 14 to the rear or inlet end of a valve passage 28c in the stem 28b. The valve passage extends axially to a location behind the plunger head 28a and then branches outwardly to the periphery of the plunger stem. When the plunger is in its rear position, shown in FIG. 4, the plunger head is against the back wall of the nozzle chamber and the discharge end of the valve passage 28 is inside the bore 26a; when so positioned, and as normally urged by spring 31, communication between cylinder 14 and the nozzle chamber is cut off.

Advance of the plunger 28–28a from its rear position in the nozzle chamber brings the discharge end of valve passage 28b out of the bore 26a in the back wall of the chamber and into the larger diameter bore of the chamber, whereby the exit end is opened and communication is established between the nozzle chamber and the supply cylinder 14; preferably, the discharge end (or ends) of passage 28b are so located with respect to the head 28a that the nozzle valve is not opened until just prior to reaching the full-extended plunger position (see FIG. 5). Plastic melt may then flow from the cylinder 14 into the nozzle chamber. The plunger head 28a has a diameter sufficiently smaller than that of the bore of the nozzle chamber to provide clearance for flow of plastic melt from valve passage 28b into the space in front of the plunger head when the plunger is advanced. Thus, as soon as the discharge end of passage 28c is opened, the pressurized fresh melt ahead of screw 13 may flow past head 28a, through port 27a and sprue 11a, to fill the mold cavity and its associated runner system.

The normal operation of the overall injection-molding machine involves the periodic movement of cylinder 14 and its carriage 7 toward and away from nozzle engagement with the die at 27–11, as determined by operation of cylinder 9. It will be understood that the advancing phase of this movement involves initial contact at 27–11, and then further movement, further compressing spring 31 and projecting plunger 28b into chamber 26, until the injection valve passage 28c is cleared through to chamber 26. As shown in FIG. 5, this condition is reached upon limiting abutment of parts 26–30, at 26b–30b.

Assume that the mold system has been prepared for a new injection of plastic into the mold, that the nozzle plunger is in rear (cut-off) position in the nozzle chamber, and that the plasticizing screw 13 is in its rear position in cylinder 14 after having prepared a fresh charge of plastic to replenish the previously ejected charge. The machine is now ready for effecting a next injection.

The injection operation involves performance of a compression or injection stroke of the nozzle. While this may be done by moving the mold system and thereby the nozzle chamber toward the injection system, I here show that the injection system and hence the nozzle plunger is moved toward the mold system. When the machine is ready for an injection operaton, fluid pressure is suitably valved to the cylinder 9 (FIG. 1) to act on its piston for advancing the injection system through a forward stroke. In the process, the plunger 28 of the nozzle moves forward to open the nozzle valve. The plasticized melt at the head end of cylinder 14 is under pressure (from piston 23) and immediately flows through the nozzle chamber, until the mold cavity is filled and screw 13 attains a forward position (FIG. 5).

It will be noted that the forces applied to the fluent plastic by the screw 13 and by the nozzle plunger 28 are in the same direction and in tandem. Thus, a charge of plastic is injected into the mold by the additive forces of the screw and the plunger. It may be put that the nozzle injects a charge into the mold aided by the advance of the screw, or the advance of the screw injects a charge aided by the nozzle, alternatively, it may be stated that the screw advance injects a charge into the nozzle which boosts the charge into the mold.

The injection system is maintained in its forward position under the influence of the maintained fluid pressure in the motor cylinder 9 until the injected plastic in the mold cavity has set. The motor cylinder may then be relieved of this pressure, allowing the spring 31 to restore the injection system to its rear or start position. Restoration may be aided by reversal of fluid pressure in the cylinder 9, but (for any given production run) the injection system need not be moved back as far as the extreme position of FIG. 4, inasmuch as the nozzle valve is cut off upon initial retracting motion of plunger 28; the preferred extent of plunger retraction is to a point just short of that illustrated in FIG. 4 (during a production run), thus assuring that spring 31 will be constantly effective to press the nozzle chamber firmly against the head member 11 of the mold system. The described return stroke of the nozzle (i.e., retraction of plunger 28) is accompanied by a decompression of melt in the nozzle and runner system, as will be explained. Having thus cut off the nozzle, plasticizing mechanism may again be operated to generate a fresh charge of melt, in the manner already described.

During its forward stroke, the plunger head 28a advances to the dotted-line position of FIG. 4, contracting the space in the nozzle chamber and working through a certain residual quantity of plastic in front of it as a new charge is being injected into the mold. At the end of this stroke, i.e., when the mold cavity is filled the contracted space is filled with another residual mass of the plastic. This mass stays under strong pressure until the plastic in the mold cavity has set, at which time the plunger 28 is sent through its decompression stroke. As the plunger head retreats to home or rear position, it vacates space in the nozzle chamber, and this vacated or expanded volume serves (after valve cut off) to relieve pressure on the residual mass of plastic, to an extent producing an intensified flow-back pressure or suction force at the constricted outlet port 27a which calls back into the chamber a quantity of fluent plastic remaining in the port or remaining in the port and the intake channeling of the mold. Once the molded parts have been removed from the mold cavity (and the mold reclamped) the sucked-back or withdrawn quantity of unused melt is sufficient to place the mold system in readiness for conducting a next, fresh charge of fluent plastic to the mold cavity. After each molding cycle, the total, residual mass of unused melt (forward of the nozzle valve) is so relieved of pressure as to avoid any tendency to drool out of the chamber or into the mold cavity; there thus is no interference between unused melt from one mold cycle and the new charge of melt injected on the next mold cycle. The avoidance of premature drool is particularly important for a mold system in which the intake channeling, especially one with a runner or runners between the sprue and the mold cavity, is held at a temperature to keep the plastic fluent while the plastic in the shaping interior is subjected to curing (i.e., setting) temperature and pressure.

It may be noted that the present arrangement, beside clearing the intake channeling and preventing premature drool, has the further advantage that there is no wastage of plastic. Only that portion of the charge into the mold which feeds into the shaping interior is utilized during the molding operation and the remainder of the charge is relieved of pressure and partially called back into the nozzle chamber to be used with the next charge. It is understood that preliminary generation of melt in the supply cylinder and transfer of melt into the nozzle chamber will be effective, prior to the first useful molding operation, to supply the nozzle chamber and runner system with a residual quantity of melt.

It will also be understood that my invention not only avoids premature drool of residual melt into a mold cavity during a productcion run, but it also makes possible such pressure relief in the runner system and nozzle chamber that drool is avoided even when the carriage 7 is fully retracted (i.e., nozzle separated from mold 11) after a molding operation.

While the invention has been described in detail in connection with the preferred form shown, it is understood that modifications may be made within the scope of the invention as defined in the claims which follow.

I claim:

1. In a molding machine having a mold system with a mold and intake channeling to conduct moldable fluent plastic received from an injection system to the shaping interior of the mold, the injection system having a supply chamber to issue such fluent plastic from a discharge opening thereof, a nozzle comprising a chamber and coacting plunger relatively reciprocable through forward and return strokes, the nozzle chamber having an outlet opening at its head end for contiguous communication with the inlet of the intake channeling, the nozzle chamber also having at a rear location a guide bore of reduced cross section relative to the bore of the nozzle chamber, the plunger having a stem reciprocably guided by the guide bore and provided with an enlarged head inside the nozzle chamber, the plunger being in rear position relative to the nozzle chamber at the beginning of a forward stroke, a valve passage extending through said stem and communicating at one end with the supply chamber and at the other end with said nozzle chamber at a location spaced rearwardly of said head, said valve passage being closed in the rear position of the plunger and opening during the forward stroke for passing fluent plastic from the supply chamber into the nozzle chamber, and means for effecting an injection operation by actuating the nozzle through a forward stroke in which the valve passage opens to supply the nozzle chamber with fluent plastic from the supply chamber while the plunger head and the head end of the nozzle chamber approach each other to contract the space in the nozzle chamber and apply an injective pressure on the plastic between the head of the plunger and the head end of the nozzle chamber for injecting a charge of the plastic through the outlet opening of the nozzle chamber into the intake channeling and the shaping interior of the mold.

2. In a machine as in claim 1 and wherein the intake channeling and its inlet involves a sprue in a head member of the mold system; the injection system further having a spring for acting on the nozzle chamber to press its head end constantly against the head member of the mold system for maintaining communication between the outlet opening of the nozzle chamber and the sprue, the spring being effectively between the nozzle chamber and the plunger to resist the forward stroke of the nozzle.

3. In a molding machine having a mold system with a mold and intake channeling to conduct moldable fluent plastic received from an injection system to the shaping interior of the mold, the injection system having a supply chamber to issue such fluent plastic from a discharge opening thereof, a nozzle comprising a chamber and coacting plunger relatively reciprocable through forward and return strokes, the plunger reaching from the discharge opening of the supply chamber forwardly toward the mold system and into the nozzle chamber and the nozzle chamber extending forwardly from the plunger toward the mold system and having an outlet opening at its head end for contiguous communication with the inlet of the intake channeling, the plunger being in rear position relative to the nozzle chamber at the beginning of a forward stroke, a valve passage closed in the rear position of the plunger and opening during the forward stroke for passing fluent plastic from the discharge opening of the supply chamber into the nozzle chamber, and means for effecting an injection operation by actuating the nozzle through a forward stroke in which the valve passage opens to supply the nozzle chamber with fluent plastic from the supply chamber while the plunger head and the head end of the nozzle chamber approach each other to contract the space in the nozzle chamber and apply an injective pressure on the plastic between the head of the plunger and the head end of the nozzle chamber for injecting a charge of the plastic through the outlet opening of the nozzle chamber into the intake channeling and the shaping interior of the mold; the nozzle chamber having at a rear location a central guide bore of reduced cross section relative to the bore of the nozzle chamber, the plunger having a stem slidably passing through the guide bore and provided with an enlarged head inside the nozzle chamber, said valve passage extending longitudinally through the plunger stem for a distance from its rear end and communicative outwardly to a discharge end at the periphery of the stem and within the guide bore and closed thereby as the plunger moves to its rear position relative to the nozzle chamber, whereby communication between the nozzle chamber and the supply chamber is closed while the plunger is in its rear position and is opened during the forward stroke of the nozzle.

4. In a machine as in claim 3, the plunger head having peripheral clearance with respect to the bore of the nozzle chamber to enable plastic to flow from the valve passage to the front of the plunger head while said head is in a forward position.

5. In a machine as in claim 4, wherein the intake channeling and its inlet involve a sprue in a head member of the mold system; said supply chamber being an elongated cylinder with its discharge opening at the front end, the plunger being an axial rigid forward extension of the cylinder, the common axis of the supply chamber and of the lunger and of the nozzle chamber being in line with the sprue, and the supply chamber having a ram therein for advancing toward the front end of the supply chamber during the forward stroke of the nozzles so as to apply ejective pressure in the plastic in the same direction and in tandem with the injective pressure of the nozzle, whereby a charge of the plastic is injected into the sprue by the nozzle aided by the advance of the ram.

6. In a machine as in claim 5, the ram being a plasticizing screw supported for rotation as well as for reciprocation within the bore of the supply cylinder and operating after closure of the valve passage at the end of the return stroke of the nozzle for converting make-up material fed into the supply chamber into fresh fluent plastic to replace the plastic transferred from the cylinder to the nozzle chamber during the preceding injection operation.

7. In a machine as in claim 1, the outlet opening of the nozzle chamber being a constricted central orifice in the head end wall of the nozzle chamber, the plunger head being a distance short of the end wall at the end of the forward stroke of the nozzle so that a residual mass of the plastic fills the contracted space between the end wall and the plunger head after injection of the plastic charge into the intake channeling and shaping interior of the mold and before the ensuing return stroke, the plunger head and the end wall moving away from each other during said return stroke to expand the space in the nozzle chamber sufficiently for the residual quantity of plastic to be fully relieved of pressure at the end of the return stroke.

8. In a machine as in claim 1, the outlet opening of the nozzle chamber being a constricted central orifice in the head end wall of the nozzle chamber, the capacity of the nozzle chamber when the plunger head is in rear position being substantially in excess of the capacity of the intake channeling, the plunger head being a distance short of said end wall at the end of the forward stroke, so that a residual mass of the plastic fills the contracted space in the nozzle chamber and between the plunger head and end wall after injection of the charge into the intake channeling and the shaping interior of the mold and before the ensuing return stroke, means for effecting said return stroke after hardening of the plastic in the shaping interior of the mold, the plunger head evacuating space in the nozzle chamber during the return stroke and after closure of the valve passage, thereby decompressing the residual mass of plastic in the nozzle and creating a suction force at the outlet orifice capable of bringing back into the nozzle chamber fluent plastic remaining in the intake channeling after hardening of the plastic in the shaping interior of the mold.

9. In a machine as in claim 8, the means for effecting the return stroke of the nozzle comprising spring means effectively between the nozzle chamber and the plunger and operative to retain the nozzle chamber with its outlet orifice in engaged communication with the inlet of the intake channeling throughout the forward and return strokes of the nozzle.

10. In a machine as in claim 9, the nozzle plunger being rigidly carried by the supply chamber, the machine having means for slidably mounting the supply chamber for actuation toward and away from the mold system, and the actuation of the nozzle through its forward and return strokes being accomplished through said actuation of the supply chamber.

References Cited

UNITED STATES PATENTS

| 2,602,189 | 7/1952 | Finelt | 18—30 |
| 2,803,854 | 8/1957 | Smous | 18—30 |
| 3,002,229 | 10/1961 | Friederich | 18—30 |
| 3,020,591 | 2/1962 | Breher et al. | 18—30 |

FOREIGN PATENTS

| 428,773 | 1/1948 | Italy. |
| 861,911 | 3/1961 | Great Britain. |
| 1,383,769 | 11/1964 | France. |

WILBUR L. McBAY, *Primary Examiner.*